United States Patent Office 3,090,785
Patented May 21, 1963

3,090,785
NEW PROCESS FOR PREPARING ACYLATED THIAMINE
Genshun Sunagawa, Akira Ito, Masatoshi Nagawa, and Mitsuru Kataoka, all % Sankyo Co., Ltd., 888 1-chome, Nishishinagawa, Shinagawa, Tokyo, Japan
No Drawing. Filed Mar. 13, 1961, Ser. No. 94,975
Claims priority, application Japan Mar. 14, 1960
12 Claims. (Cl. 260—256.6)

The present invention relates to a new process for preparing thiamine derivatives. More particularly, it relates to a new process for preparing thiamine derivatives having the general formula

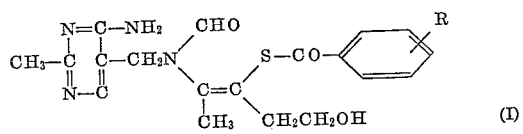
(I)

wherein R is a member selected from the group consisting of hydrogen, halogen, methyl and nitro.

S-benzoyl- and S-(p-nitrobenzoyl)thiamines and a process for their preparation have been disclosed in a publication by Yakugaku Zasshi (J. Pharm. Soc. Japan) while S-acylthiamines including S-(p-nitrobenzoyl)thiamine as illustrative examples and a process for preparing these compounds have been described in U.S. Patent No. 2,752,348. The patentee of the U.S. patent states that these derivatives are thought to be absorbed from the intestinal canal to liberate vitamine $B_1$ and display vitamin $B_1$ activity in the living body without being affected by the vitamin $B_1$ decomposition factors.

The process described in the aforementioned U.S. patent consists of an acylation reaction using acylating agents such as carboxylic acid anhydrides and carboxylic acid halides. However, according to this prior art process, acyl radicals are generally introduced both in the sulfhydryl group and the hydroxyl group of the hydroxyethyl group of thiol-type thiamine. When certain special conditions are satisfied, then, according to the teachings of the U.S. patent referred to, the acyl group is introduced in the sulfhydryl group only. The S-acyl compounds which are disclosed in the patent are S-butyroyl- and S-(p-nitrobenzoyl)thiamines.

Pursuant to the patented prior art process, S-benzoyl- and S-(p-nitrobenzoyl)thiamines are produced only after complicated procedures.

It is an object of this invention to provide a new process which is superior to the prior art process referred to by selectively introducing benzoyl or substituted benzoyl exclusively in the sulfhydryl group of thiol-type thiamine. This is accomplished by the use of sodium benzoyl or substituted benzoyl thiosulfate which has not previously been used as acylating agent for the intended purpose.

As a result of studies on methods capable of easily introducing benzoyl or substituted benzoyl exclusively in the sulfhydryl group of thiol-type thiamine without the use of the prior art acylating agents as described in the above-mentioned U.S. patent, it has been unexpectedly discovered that the reaction of thiamine with sodium benzoyl or substituted benzoyl thiosulfate under alkaline conditions results in the introduction of benzoyl or substituted benzoyl group exclusively in the sulfhydryl group of thiol-type thiamine thereby readily yielding the desired S-benzoyl thiamine or substituted S-benzoyl thiamine in a high yield. The hydroxyl group is not affected. Sodium benzoyl thiosulfate and sodium substituted benzoyl thiosulfate are compounds, which have never before been employed for the production of acylated compounds.

Briefly, the process of the present invention comprises reacting thiamine with sodium benzoyl or substituted benzoyl thiosulfate having the formula

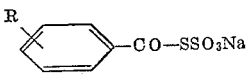
(II)

where R represents a member selected from the group consisting of hydrogen, halogen, methyl and nitro under alkaline condition to produce S-benzoyl or substituted S-benzoylthiamine of the Formula I described above.

S-benzoyl and substituted S-benzoyl thiamines obtained in the process according to the present invention are useful thiamine derivatives which are absorbed more effectively and display higher and longer durable thiamine levels in the viscera than thiamine salts, O-acyl or O,S-diacylthiamines. Moreover, they are useful as intermediates for the preparation of valuable thiamine derivatives such as S-benzoylthiamine monophosphate and the like.

In carrying out the process of the present invention, thiamine is reacted with sodium benzoyl or substituted benzoyl thiosulfate having the Formula II at pH values ranging between about 7–10. The reaction may be effected under alkaline condition, i.e. at a pH of about 7–10, in water or in an aqueous organic solvent such as aqueous methanol, aqueous ethanol, aqueous acetone or aqueous dioxane. The preferred pH range is 7–8. The reaction temperature may be varied depending upon the pH at which the reaction is carried out. In practice, the reaction is conducted at temperatures below those causing decomposition of thiol-type thiamine at the particular pH value. It is preferred to carry out the reaction at temperatures of about 0–30° C., especially at about 5–20° C. The molar ratio of the reactants is theoretically 1:1, but 1.5–3 moles of sodium benzoyl or substituted benzoyl thiosulfate per 1 mole of thiamine is preferably used in practice. On actual commercial production, it is preferable to treat thiamine with sodium benzoyl or substituted benzoyl thiosulfate in a molar ratio of 1:1.5–2.0 at a pH of about 7–8 and at temperature of about 10–20° C. After completion of the reaction, the desired product, S-benzoyl or substituted benzoyl thiamine, is obtained from the reaction mixture by filteration.

Sodium benzoyl or substituted benzoyl thiosulfate may be easily produced by reacting sodium thiosulfate with benzoyl or substituted benzoyl halides.

For the purpose of giving those skilled in the art a better understanding of the invention, the following illustrative examples are given. However, it is to be understood that these examples are not given to limit the scope of the invention.

Example 1

4.2 g. of p-chlorobenzoyl chloride are added dropwise and under stirring to a mixture of 5 g. of sodium thiosulfate, 5 cc. of water and 10 cc. of ethanol. The temperature is maintained at 8–10° C. Sodium p-chlorobenzoyl thiosulfate precipitated from the reaction mixture.

3.4 g. of crude crystals are obtained (61% of the theoretical amount).

To a solution of 3 g. of thiamine hydrochloride in 20 cc. of water are added dropwise and at temperature of about 10° C., 11 cc. of 10% sodium hydroxide solution, followed by addition of 30 cc. of ethyl acetate. To the resulting mixture are added with stirring 3.5 g. of the aforementioned crude crystals of sodium p-chlorobenzoylthiosulfate. Crystals thus formed are separated by filtration and washed three times with water and then three times with ethanol to obtain 2.8 g. of S-(p-chlorobenzoyl)-thiamine, M.P. 143° C. (75% of the theoretical amount).

*Analysis.*—Found: C, 54.13; H, 4.95; N, 13.21. Calc'd for $C_{19}H_{21}ClN_4O_3S$: C, 54.15; H, 4.98; N, 13.30.

Example 2

6 g. of p-methylbenzoyl chloride is dropped under stirring into a mixture of 9.5 g. of sodium thiosulfate, 10 cc. of water and 10 cc. of ethanol. The temperature is maintained at 13–15° C. A yellow oily substance separates which upon cooling crystallizes. Crude crystals of sodium p-methyl-benzoylthiosulfate weighing 5.8 g. are obtained (59% of the theoretical amount).

To a solution of 7.7 g. of thiamine hydrochloride in 75 cc. of water are added dropwise at a temperature of about 10° C., 18.5 cc. of 15% sodium hydroxide solution. 5.8 g. of the crude p-methylbenzoylthiosulfate crystals are added to the resulting mixture while stirring and at 10° C. An emulsified solution is obtained after stirring for additional 20–30 min. Upon cooling, crystals separate from the solution; 6 g. of S-p-methylbenzoylthiamine melting at 154–155° are obtained (65.5% of the theoretical amount).

*Analysis.*—Found: C, 60.32; H, 5.92; N, 14.13. Cacl'd for $C_{20}H_{24}N_4O_3S$: C, 60.00; H, 6.00; N, 14.00.

Example 3

22 cc. of benzoyl chloride are added in dropwise manner and under stirring to a mixture of 40 g. of sodium thiosulfate, 40 cc. of water and 80 cc. of ethanol. The temperature is maintained at 10° C. Precipitating crystals of sodium benzoylthiosulfate are separated by filtration; weight 28 g.

To a solution of 3.75 g. of thiamine hydrochloride in 24 cc. of 5% sodium hydroxide solution are added 2.9 g. of the aforementioned sodium benzoylthiosulfate. The reaction solution becomes turbid immediately after completion of the addition, followed by precipitation of a glutinous mass. Stirring for 0.5–1 hr. results in complete solidification of the glutinous mass which is separated by filtration, washed first with water and then with a small amount of ethyl acetate whereafter it is dried. The yield was 3.1 g. of S-benzoylthiamine melting at 143–144° C. (80.5% of the theoretical amount).

Example 4

Sodium p-nitrobenzoylthiosulfate weighing 20 g. is obtained from 40 g. of sodium thiosulfate and 29 g. of p-nitrobenzoyl chloride by the same procedure as in the above example except that 20 cc. of benzene is used as the adjuvant for dissolution of the crystalline p-nitrobenzoyl chloride.

To a solution of 3.37 g. of thiamine hydrochloride in 24 cc. of water are added 3.42 g. of the aforementioned sodium p-nitrobenzoylthiosulfate. The reaction solution becomes turbid immediately after completion of the addition, followed by precipitation of a glutinous mass. Stirring for 30 min. results in complete solidification of the glutinous mass, which is separated by filtration, washed with water and dried to yield 3 g. of S-(p-nitrobenzoyl)-thiamine melting at 133–135° C. (69.5% of the theoretical amount).

We claim:

1. A process for preparing compounds having the formula

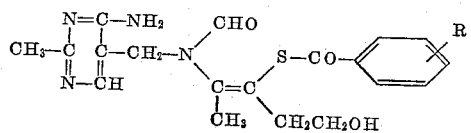

wherein R is a member selected from the group consisting of hydrogen, halogen, methyl and nitro which comprises reacting thiamine under alkaline conditions with compounds having the formula

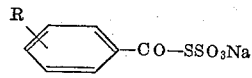

wherein R has the same meaning as above.

2. A process as in claim 1, wherein the reaction is carried out at a pH value ranging between about 7 to 10.

3. A process as claimed in claim 1, wherein the reaction is carried out in water.

4. A process as claimed in claim 1, wherein the reaction is carried out in an aqueous organic solvent selected from the group consisting of aqueous methanol, aqueous ethanol, aqueous acetone and aqueous dioxane.

5. A process as claimed in claim 1, wherein the reaction is carried out at a temperature ranging between 0–30° C.

6. A process as claimed in claim 1, wherein the molar ratio between said thiamine and said compound

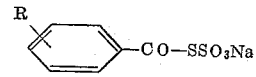

is between about 1:1.5–1:3.

7. A process as in claim 1, wherein the reaction is carried out at a pH value of about between 7–8, at a temperature of about between 10–20° C. and at a molar ratio between said thiamine and said compound

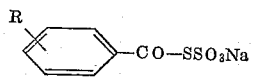

of about between 1:1.5–1:2.0.

8. A process as in claim 1, wherein said compound

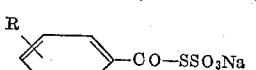

is sodium benzoyl thiosulfate.

9. A process of preparing S-(p-chlorobenzoyl) thiamine, which comprises reacting thiamine hydrochloride in an aqueous alkaline medium with sodium-p-chlorobenzylthiosulfate, and separating the reaction product obtained.

10. A process of preparing S-(p-methylbenzoyl) thiamine, which comprises reacting thiamine hydrochloride in a aqueous alkaline medium with p-methylbenzoylthiosulfate, and separating the reaction product obtained.

11. A process of preparing S-benzoylthiamine, which comprises reacting thiamine hydrochloride in an aqueous alkaline medium with sodium benzoylthiosulfate, and separating the reaction product obtained.

12. A process of preparing S-(p-nitrobenzoyl) thiamine, which comprises reacting thiamine hydrochloride in an aqueous alkaline medium with sodium-p-nitrobenzoylthiosulfate, and separating the reaction product obtained.

References Cited in the file of this patent

UNITED STATES PATENTS 2,752,348    Matsukawa et al.  ---------- June 26, 1956